United States Patent
Ono (10) Patent No.: US 7,175,120 B2
(45) Date of Patent: Feb. 13, 2007

(54) ELECTRIC FISHING REEL

(75) Inventor: Masashi Ono, Kodaira (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 11/366,423

(22) Filed: Mar. 3, 2006

(65) Prior Publication Data

US 2006/0283998 A1 Dec. 21, 2006

(30) Foreign Application Priority Data

Jun. 15, 2005 (JP) .......................... P2005-175438

(51) Int. Cl.
*A01K 89/02* (2006.01)
(52) U.S. Cl. ..................... 242/250; 242/253
(58) Field of Classification Search ................ 242/250, 242/253, 263, 268, 269, 270
See application file for complete search history.

(56) References Cited

U.S. PATENT DOCUMENTS

| | | | | |
|---|---|---|---|---|
| 4,191,340 A | * | 3/1980 | Kubanek | ................. 242/390.1 |
| 4,832,277 A | * | 5/1989 | Ohtake | ........................ 242/250 |
| 4,932,602 A | * | 6/1990 | Scott | ........................ 242/394.1 |
| 5,397,071 A | * | 3/1995 | Nanbu | ......................... 242/250 |
| 5,878,523 A | * | 3/1999 | Wenzel | ........................... 43/21 |
| 6,896,216 B2 | * | 5/2005 | Chiba | ......................... 242/250 |

FOREIGN PATENT DOCUMENTS

JP           3537363           3/2004

* cited by examiner

*Primary Examiner*—Emmanuel M Marcelo
(74) *Attorney, Agent, or Firm*—Sughrue Mion, PLLC (57) ABSTRACT

An electric fishing reel which is provided with a speed change mechanism excellent in silence and durability while realizing the size reduction. The electric fishing reel comprises: a drive motor for rotationally driving a spool rotatably supported on a reel body; a speed change mechanism rotatably mounted on a motor spindle and including an output gear having a rotational speed switched into a high speed or a low speed in accordance with the rotational direction of the motor spindle; and a power transmission mechanism for transmitting the rotation of the output gear to the spool. The speed change mechanism switches the rotational speed of the output gear by regulating the transmission of the rotation of the motor spindle with respect to the output gear.

5 Claims, 6 Drawing Sheets

FIG. 8

ELECTRIC FISHING REEL

BACKGROUND OF THE INVENTION

The present invention relates to an electric fishing reel which is provided with a drive motor for rotationally driving a spool rotatably supported on a reel body.

Generally, the electric fishing reel is provided with a speed change mechanism for reeling operations at a speed according to the situations. As this speed change mechanism, there has been proposed (as referred to Japanese Patent No. 3,537,363, for example) a mechanical type speed change mechanism, in which a high-speed reduction gear mechanism and a low-speed reduction gear mechanism are connected between a motor output shaft and a spool power transmission mechanism so that the power transmission state is switched into the high speed and the low speed by selecting one gear mechanism in accordance with the rotational direction of a drive motor.

In the mechanical type speed change mechanism disclosed in Japanese Patent No. 3,537,363, however, the high-speed and low-speed power transmission shafts to be used for the high-speed and low-speed power transmission state, respectively, are individually arranged at positions apart from the motor output shaft. This arrangement raises a problem that the additional spaces are needed in the radial directions thereby to make it difficult to reduce a size of the entire electric reel. Especially in the electric reel of the arrangement, in which the drive motor and the reduction gear mechanism are arranged in the spool, the size reduction of the electric reel is made more difficult by the relation between the size of the spool and the line winding capacity.

In the aforementioned speed change mechanism, the driving force of the drive motor is transmitted through the power transmission route constituted by many gears belonging to the speed change mechanism, the spool power transmission mechanism, the reduction gear mechanism and so on. This transmission raises a problem that meshing noises (chatter) are easily made by the gears rotating at the high speed at the time of power transmission.

In the aforementioned speed change mechanism, when one gear mechanism is selected to transmit the driving force of the drive motor to the spool power transmission mechanism, the power transmission of the other gear mechanism is regulated by a one-way clutch. In this gear mechanism, however, there exist the gears which rotate at high speeds in accordance with the rotation of the motor output shaft. Therefore, these gears are subject to useless loads for endurance although they are not used for the power transmission, which is not preferable.

SUMMARY OF THE INVENTION

The present invention has been conceived on the basis of the problems thus far described, and has an object to provide an electric fishing reel which is provided with a speed change mechanism excellent in silence and durability while realizing the size reduction.

In order to achieve the aforementioned object, according to the invention, there is provided an electric fishing reel comprising: a drive motor for rotationally driving a spool rotatably supported by a reel body; a speed change mechanism rotatably mounted on the spindle of the drive motor and including an output portion having its rotational speed switched into a high speed or a low speed in accordance with the rotational direction of the spindle; and a power transmission mechanism for transmitting the rotation of the output portion to the spool, wherein the rotational speed of the output portion is switched by regulating the transmission of the rotation of the spindle to the output portion.

According to the electric fishing reel thus constructed, the speed change mechanism having the output portion capable of switching the rotational speed is rotatably mounted on the motor spindle of the drive motor so that the rotational speed of the output portion is switched by regulating the transmission of the rotations of the motor spindle to the output portion. As a result, the driving force of the drive motor is adjusted while being received by the speed change mechanism so that the rotational speed of the output portion can be switched. Therefore, the speed change mechanism can be made smaller in size than the speed change mechanism, which adjusts the rotational driving force of the motor spindle differently, so that the speed change mechanism can be mounted in the restricted space. As a result, the electric fishing reel itself can be reduced in size and weight so that its operability can be improved for the user.

Moreover, the driving force of the drive motor is adjusted while being received, to switch the rotational speed of the output portion. Therefore, the transmission route of the driving force of the drive motor so that the number of gears on the transmission route can be reduced to prevent their meshing noises thereby to provide an electric reel excellent in silence. Moreover, the transmission route of the driving force of the drive motor is simplified so that the unnecessary power transmission route can be reduced at the driving force transmitting time. As a result, the gear, which might otherwise be unnecessarily loaded, can be eliminated from that power transmission route thereby to provide the electric fishing reel excellent in durability.

In an electric fishing reel thus constructed, the speed change mechanism can be constructed, for example, of a planetary gear mechanism using a one-way clutch for regulating the rotations. Specifically, the speed change mechanism includes: a sun gear mounted on the spindle; planetary gears meshing with the sun gear; an internal gear meshing with the planetary gears and having the output portion formed therein; a planetary gear support for supporting the planetary gears; a first one-way clutch for regulating the rotations of the planetary gear support in a predetermined direction; and second one-way clutches for regulating the rotations of the planetary gears in a predetermined direction, and the rotational speed of the output portion can be switched by regulating the rotations of the planetary gear support and the planetary gears with the first and second one-way clutches.

In case the speed change mechanism employs the planetary gear mechanism for regulating the rotations by using the one-way clutches, the speed of the rotational driving force of the drive motor can be changed with a space equivalent to that of the ordinary planetary gear mechanism so that the space necessary especially in the rotational axial direction can be reduced. Moreover, the rotational driving force of the drive motor can be transmitted via the power transmission route of the sun gear, the planetary gears and the internal gear, which are used in the ordinary planetary gear mechanism, so that the silence and durability can be retained at the same level as that of the ordinary planetary gear mechanism.

In the electric fishing reel thus constructed, moreover, the drive motor, the speed change mechanism and the power transmission mechanism may be arranged in the spool. In this case, the space for housing the drive motor, the speed change mechanism and the power transmission mechanism can be suppressed to a small one according to the size reduction of the speed change mechanism. Therefore, even in the case of the construction, in which the drive motor and so on are arranged in the spool, the entire size reduction of the electric fishing reel can be realized. Especially in the electric reel of the construction, in which the speed change mechanism is arranged in the space, the meshing noises of the gears on the power transmission route can be more reduced to provide the electric fishing reel more excellent in silence.

In the electric fishing reel thus constructed, moreover, the power transmission mechanism may be constructed of a planetary gear mechanism so that the output portion of the speed change mechanism is made to function as the sun gear of the planetary gear mechanism. In this case, the output portion of the speed change mechanism acts as a portion of the power transmission mechanism so that the number of parts of the power transmission mechanism can be reduced to make smaller the space necessary for the speed change mechanism and the power transmission mechanism. Moreover, the number of parts can be reduced to reduce the cost necessary for manufacturing those mechanisms.

According to the invention, it is possible to provide the electric fishing reel which is provided with the speed change mechanism excellent in the silence and the durability while realizing the size reduction.

1: Electric fishing reel
3: Reel Body
4: Spool
5: Drive Motor
6: Motor Casing
7: Motor Spindle
11: Speed Change Mechanism
12: Power Transmission Mechanism
16: Output Gear
40: Sun Gear
41: Planetary Gear
42: Internal Gear
43: Planetary Gear Support
44, 45: One-Way Clutch

DETAILED DESCRIPTION OF PREFERRED EMBODIMENTS

Embodiments of the present invention will be described with reference to the accompanying drawings.

First Embodiment

Figure 1:
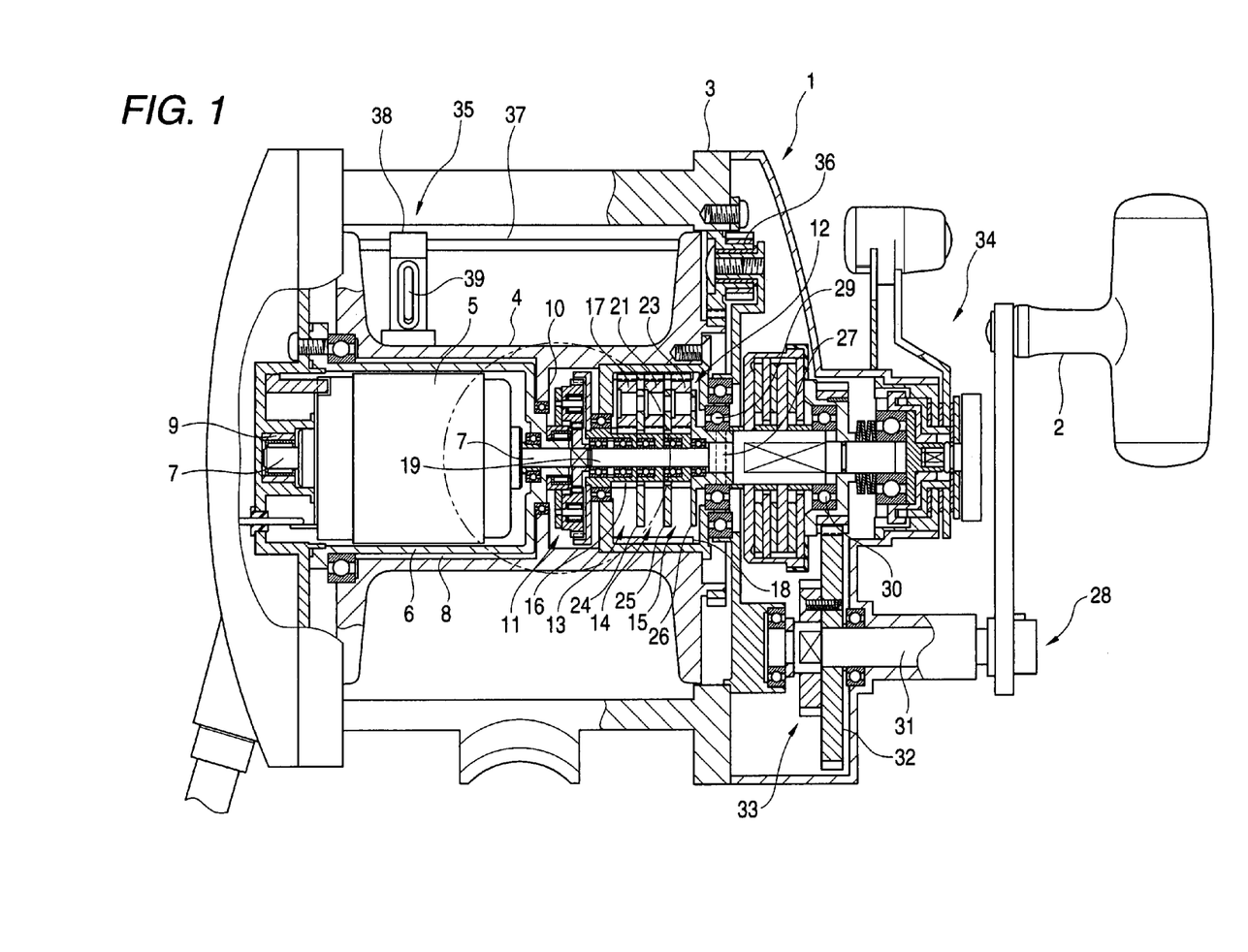
FIG. 1 is a partially sectional top plan view showing a portion, in which a speed change mechanism is arranged.
Figure 2:
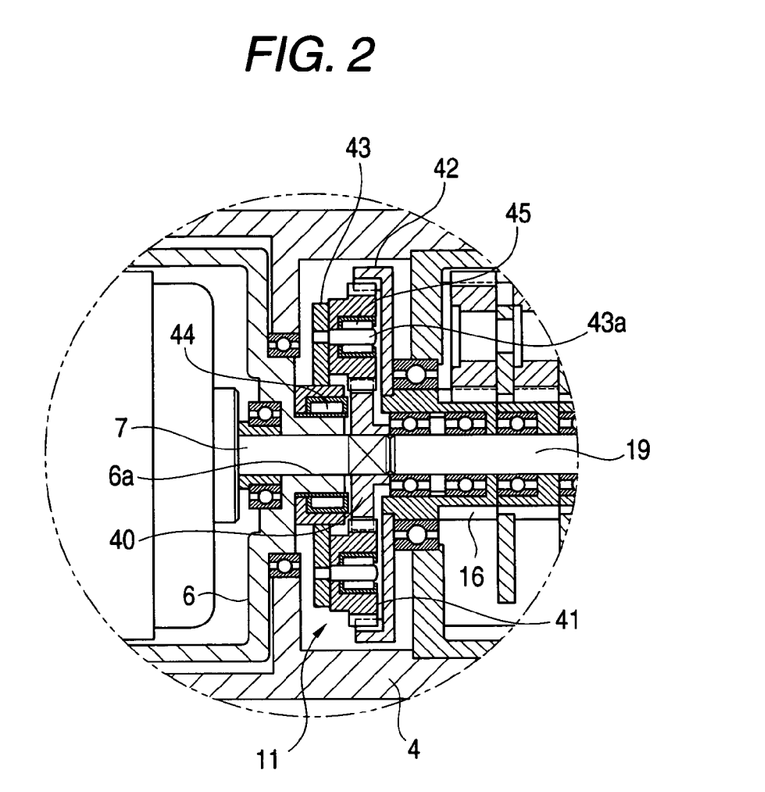
FIG. 2 is a diagram showing the construction of the speed change mechanism.
Figure 3:
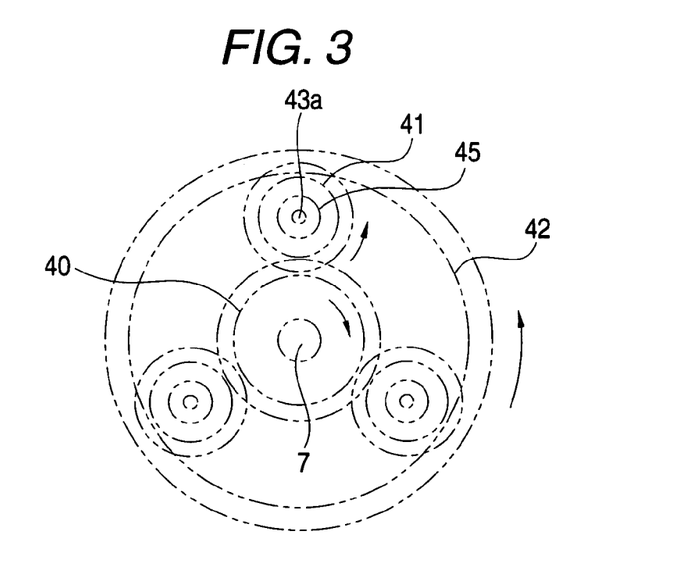
FIG. 3 is a schematic diagram for explaining a power transmission route in a low-speed mode.
Figure 4:
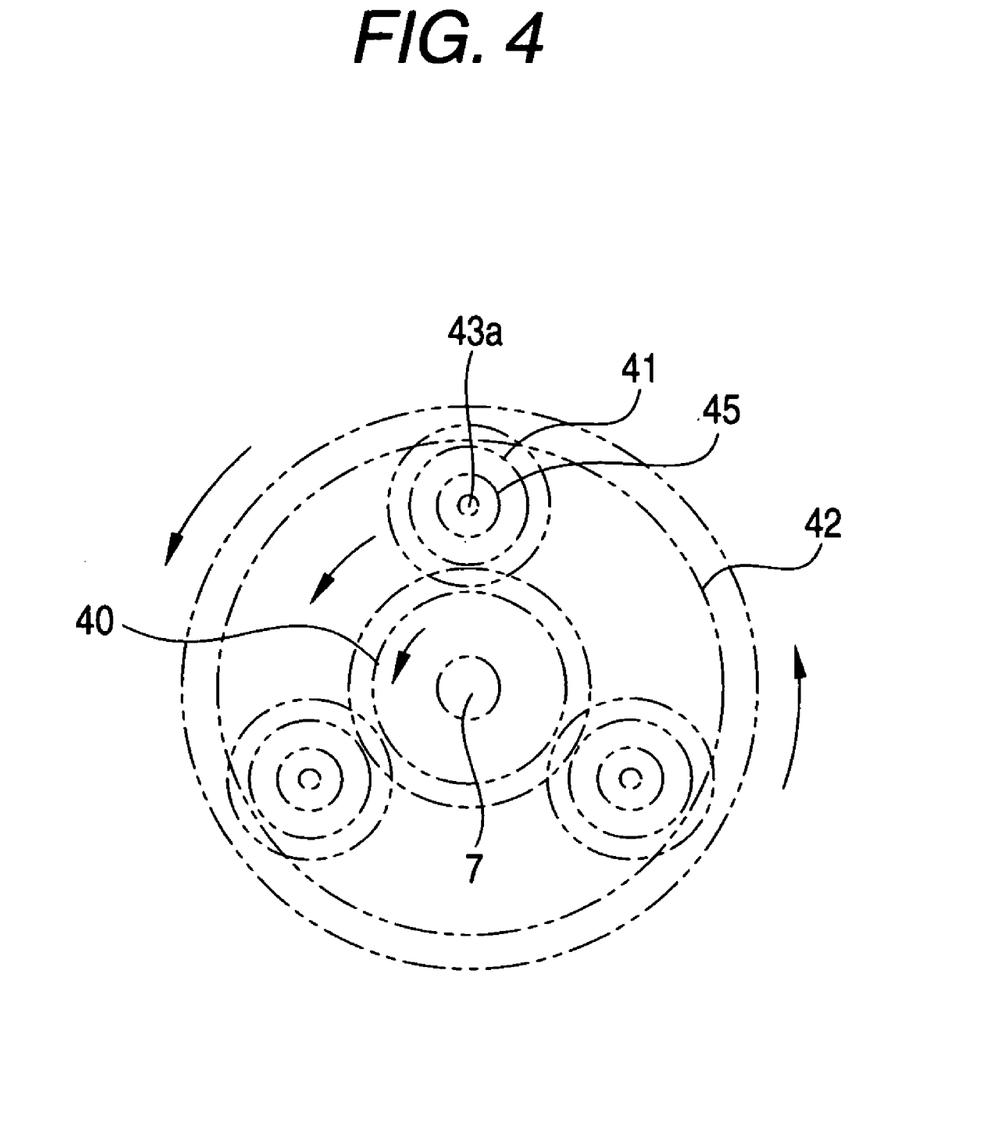
FIG. 4 is a schematic diagram for explaining a power transmission route in a high-speed mode.

FIG. 1 to FIG. 4 show a first embodiment of the electric fishing reel according to the invention. FIG. 1 is a partially sectional top plan view showing a portion, in which a speed change mechanism is arranged. FIG. 2 is a diagram showing the construction of the speed change mechanism. FIG. 3 is a schematic diagram for explaining a power transmission route in a low-speed mode. FIG. 4 is a schematic diagram for explaining a power transmission route in a high-speed mode. Here, the "forward rotation" means a clockwise rotation, as viewed in FIG. 1 from the left side side, and the "backward rotation" means a counter-clockwise rotation, as viewed in the same as above.

An electric fishing reel 1 of this embodiment is equipped with a reel body 3, to which a manual handle 2 is attached. Between the left side and right side frames constructing the reel body 3, a spool 4 is rotatably supported through a bearing. In this spool 4, there is held a drive motor 5, which can be switched in its rotating directions.

The drive motor 5 is disposed in a cylindrical motor casing 6, which is fixed on the left side frame of the reel body 3. The drive motor 5 is equipped with a spindle (as will be called the "motor spindle") 7, which is rotationally driven by a rotor (although not shown). The motor casing 6 is so arranged to protrude into a motor housing 8 formed in the spool 4 so that its root end portion is attached to the left side frame side of the reel body 3.

The motor casing 6 has its root end side closed by the left side frame of the reel body 3. At the central portion of the closed portion, there is arranged a bearing (e.g., metal bearing) 9 for supporting one end of the motor spindle 7 rotatably. On the other hand, as to the leading end side of the motor casing 6, a portion in which the motor spindle 7 is arranged is formed so as to be expanded in the axial direction, and this portion extends into a center opening of a partition 10 formed in the spool.

The central portion of that portion, which extends into the central opening of the partition 10, is axially protruded. On this portion and the motor spindle 7 protruding from the former, there is mounted a speed change mechanism 11 for switching a high-speed power transmission state (as will be suitably called the "high-speed mode") and a low-speed power transmission state (as will be suitably called the "low-speed mode") in accordance with the rotational direction of the motor spindle 7. At the position closer to the right side frame side of the reel body 3 than the speed change mechanism 11, there is arranged a power transmission mechanism 12 for transmitting the driving force of the drive motor to the spool 4.

The power transmission mechanism 12 functions as a reduction gear mechanism for transmitting the driving force of the drive motor 5 in a reduced speed state to the spool 4. This reduction gear mechanism is constituted by three stages of first to third planetary gear mechanisms 13 to 15. The rotational driving force (e.g., the rotational driving force in the high-speed mode or the rotational driving force in the low-speed mode), generated from the motor spindle 7 by rotating the drive motor 5 forward or backward, is reduced in speed by the first planetary gear mechanism 13 and is then further reduced in speed by the second planetary gear mechanism 14 and the third planetary gear mechanism 15 so that it is transmitted to the spool 4.

The first planetary gear mechanism 13 includes an output gear 16 for rotating integrally with the internal gear of the later-described speed change mechanism 11 and for functioning as a first sun gear, a first planetary gear 17 meshing with the output gear 16, and an internal gear 18 formed in the end face of the spool 4 for being meshed by the first planetary gear 17. Here, the output gear 16 is rotatably supported through a bearing on a rotary drive shaft 19 disposed coaxially with the motor spindle 7. The output gear 16 functions as the output portion of the speed change mechanism 11.

On the other hand, the second planetary gear mechanism 14 includes a second sun gear 20 rotatably supported through a bearing by, the rotary drive shaft 19, and a second planetary gear 21 meshing with the sun gear 20. Likewise, the third planetary gear mechanism 15 includes a third sun gear 22 rotatably supported through a bearing by the rotary drive shaft 19, and a third planetary gear 23 meshing with the sun gear 22. Here, the second planetary gear 21 and the third planetary gear 23 are arranged to mesh with the internal gear 18 at all times.

The first planetary gear 17 is supported by a first carrier 24, which is connected to the second sun gear 20. On the other hand, the second planetary gear 21 is supported by a second carrier 25, which is connected to the third sun gear 22. Moreover, the third planetary gear 23 is supported by a third carrier 26, which is connected to the rotary drive shaft 19 by a retaining pin 27 so that it rotates integrally with the rotary drive shaft 19. Here, the rotary drive shaft 19 is made diametrically larger from its portion connected to the third carrier 26 to the right side frame of the reel body 3 than the portion extending through the reduction gear mechanism.

To the rotary drive shaft 19 protruding from the reduction gear mechanism to the right side frame side, there is connected a manual winding drive unit 28, which is equipped with the aforementioned manual handle 2. When the rotary drive shaft 19 is connected to the manual winding drive unit 28, the rotary drive shaft 19 transmits the power of the manual winding drive unit 28 to the reduction gear mechanism. Here, the rotary drive shaft 19 (or the third carrier 26 connected to the rotary drive shaft 19) is rotatably supported by a bearing 29 and a bearing 30.

The manual winding drive unit 28 is equipped with the manual handle 2, a handle shaft 31 for rotating integrally with the manual handle 2, and a drive gear 32 fitted and locked on the handle shaft 31. On the root end portion of the handle shaft 31, there is arranged a well-known plugging mechanism 33 for preventing the rotation of the handle shaft 31, which might otherwise be caused in association with the rotation of the spool 4 in the line winding direction by the drive motor 5.

On the other hand, a drag mechanism 34 is attached to the rotary drive shaft 19 protruding from the reduction gear mechanism to the right side frame side. The drag mechanism 34 is frictionally coupled to the rotary drive shaft 19 so that it takes a braking action to allow the spool 4 to rotate in the line reeling-out direction while applying the braking force to the spool 4, as well known in the art. At the same time, by adjusting the braking force, the drag mechanism 34 takes a clutch action to switch the spool 4 between the free rotation state and the line reeling-in state.

In front of the line reeling-out direction of the spool 4, there is arranged a level wind mechanism 35, which acts in association with the rotation of the spool 4. This level wind mechanism 35 includes the (not-shown) worm shaft interlocked to the spool 4 through an associative gear 36, a guide pin 37 spanned between the left side and right side frames in parallel with the worm shaft, and an engaging member 38 engaging with the (not-shown) traverse groove of the worm shaft and rocked to the right and left along the guide pin 37 by the rotations of the worm shaft. The level wind mechanism 35 guides the level wound on the spool 4, through a slot 39 formed in the engaging member 38. When the manual handle 2 is turned, the line is homogeneously wound on the spool 4 by the rotations of the spool 4 and the transverse sliding motions of the engaging member 38.

Here is described the construction of the aforementioned speed change mechanism 11 with reference to FIG. 2. As shown in FIG. 2, the speed change mechanism 11 is rotatably mounted on the motor spindle 7 so that it is switched between the high-speed mode and the low-speed mode in accordance with the rotational direction of the motor spindle 7. Specifically, the speed change mechanism 11 is constructed of a planetary gear mechanism so that it is switched between the high-speed mode and the low-speed mode by regulating the rotation through one-way clutches disposed at predetermined positions of the planetary gear mechanism.

Here is described the construction of the planetary gear mechanism functioning as the speed change mechanism 11. This planetary gear mechanism functioning as the speed change mechanism 11 is composed of a sun gear 40 mounted in a locked state on the motor spindle 7, a plurality of planetary gears 41 meshing with the sun gear 40, an internal gear 42 meshing with those planetary gears 41, and a planetary gear support 43 for supporting the planetary gears 41.

The planetary gear support 43 is rotatably mounted through a one-way clutch 44 on the portion 6a of the motor casing 6, which protrudes to the side of the speed change mechanism 11. The planetary gears 41 are rotatably mounted on support pins 43a of the planetary gear support 43 through one-way clutches 45. These one-way clutches 44 and 45 regulate the rotations of the planetary gear support 43 and the planetary gears 41, respectively, in the predetermined direction.

The internal gear 42 fixes the aforementioned output gear 16 on its side face on the side of the power transmission mechanism 12 so that it rotates integrally with that output gear 16. Therefore, the rotational driving force by the motor spindle 7 is transmitted through the sun gear 40 and the planetary gears 41 to the internal gear so that it is transmitted to the power transmission mechanism 12 through the output gear 16 fixed in the internal gear 42. Moreover, the transmission of the rotational driving force by the motor spindle 7 to the output gear 16 is regulated by the one-way clutches 44 and 45 so that the speed change mechanism 11 is switched between the high-speed mode and the low-speed mode.

With reference to FIG. 3 and FIG. 4, here are described the power transmission routes in the low-speed mode and the high-speed mode together with the actions of the one-way clutches 44 and 45. FIG. 3 and FIG. 4 are schematic views of the reel body 3, as viewed from the left side frame side of the reel body 3.

The one-way clutch 44, as arranged between the planetary gear support 43 and the motor casing 6, is constructed to regulate the rotational driving force in the forward direction, as shown in FIG. 3 and FIG. 4, but to permit the rotational driving force in the backward direction. On the other hand, the one-way clutches 45, as arranged between the planetary gears 41 and the planetary gear support 43, are constructed to regulate the rotational driving force in the forward direction, as shown in FIG. 3 and FIG. 4, but to permit the rotational driving force in the backward direction.

In the speed change mechanism 11 equipped with such one-way clutches 44 and 45, when the motor spindle 7 is driven forward, the sun gear 40 also rotates forward, as shown in FIG. 3. When the sun gear 40 rotates forward, the planetary gears 41 rotate backward. At this time, according to the backward revolutions of the planetary gears 41, the force in the same forward direction as that of the sun gear 40 acts on the planetary gear support 43. However, the forward rotation of the planetary gear support 43 is regulated by the action of the one-way clutch 44 so that the planetary gears 41 do not move (or revolve) together with the planetary gear support 43 but rotate backward (or rotate on their axes). Here, the one-way clutches 45 permit the backward drives of the planetary gears 41 so that the backward rotations of the planetary gears 41 are not regulated. According to the backward rotations of the planetary gears 41, the internal gear is rotated backward in the same direction in the reduced speed state. Thus, the rotational driving force of the motor spindle 7 in the forward direction is transmitted through the planetary gears 41 to the internal gear 42 so that it is decelerated (to the low-speed mode).

When the internal gear 42 rotates backward, the output gear 16 integral with the internal gear 42 also rotates backward so that the rotational driving force of the motor spindle 7 is transmitted to the power transmission mechanism 12. The power transmission mechanism 12 transmits the rotational driving force transmitted from the speed change mechanism 11 and decelerated by the first to third planetary gear mechanisms 13 to 15, to the spool 4. Therefore, when the motor spindle 7 is driven forward, the spool 4 is rotationally driven in the low-speed mode.

In this speed change mechanism 11, on the other hand, when the motor spindle 7 is driven backward, the sun gear 40 also rotates backward, as shown in FIG. 4. At this time, a forward rotating force acts on the planetary gear 41 as the sun gear 40 rotates backward. However, the forward rotations of the planetary gears 41 are regulated by the actions of the one-way clutches 45. Therefore, the planetary gears 41 do not rotate forward, but the planetary gear support 43 rotates backward (or revolve) in the same direction as that of the sun gear 40 although the planetary gears 41 are stopped. Here, the one-way clutches 44 allows the backward drive of the planetary gear support 43 so that the planetary gear support 43 is not regulated in the backward rotations in the same direction as that of the sun gear 40. In accordance with the backward rotation of the planetary gear support 43, moreover, the internal gear 42 also rotates backward integrally with and in the state to mesh with the planetary gears 41. Thus, the rotational driving force of the motor spindle 7 in the backward direction is neither subjected to the rotating actions of the planetary gears nor decelerated but is transmitted to the internal gear 42 (in the high-speed mode).

When the internal gear 42 rotates backward, the output gear 16 integrated with the internal gear 42 also rotates backward as in the aforementioned low-speed mode so that the rotational driving force by the motor spindle 7 is transmitted to the power transmission mechanism 12. The power transmission mechanism 12 transmits the rotational driving force transmitted from the speed change mechanism 11 and decelerated by the first to third planetary gear mechanisms 13 to 15, to the spool 4. Therefore, when the motor spindle 7 is driven backward, the spool 4 is rotationally driven in the high-speed mode.

In the electric fishing reel 1 of this embodiment, as has been described hereinbefore, the speed change mechanism 11 having the output gear 16 capable of switching the rotational speed is rotatably mounted on the motor spindle 7 of the drive motor 5 so that the rotational speed of the output gear 16 is switched by regulating the transmission of the rotations of the motor spindle 7 to the output gear 16. As a result, the driving force of the drive motor 5 is received by the speed change mechanism 11 to be adjusted so that the rotational speed of the output gear 16 can be switched. Therefore, the speed change mechanism 11 can be made smaller in size than the speed change mechanism, which adjusts the rotational driving force of the motor spindle differently, so that the speed change mechanism 11 can be mounted in the restricted space. As a result, the electric fishing reel 1 itself can be reduced in size and weight so that its operability can be improved for the user.

Moreover, the driving force of the drive motor 5 is received and adjusted to switch the rotational speed of the output gear 16. Therefore, the transmission route of the driving force of the drive motor 5 is simplified so that the number of gears on the transmission route can be reduced to prevent their meshing noises thereby to provide an electric reel excellent in silence. Moreover, the transmission route of the driving force of the drive motor 5 is simplified so that the unnecessary power transmission route can be reduced at the driving force transmitting time. As a result, the gear, which might otherwise be unnecessarily loaded, can be eliminated from that power transmission route thereby to provide the electric fishing reel 1 excellent in durability.

Especially in the electric fishing reel 1 of this embodiment, the speed change mechanism 11 is constructed of the planetary gear mechanism for regulating the rotations using the one-way clutches 44 and 45. Specifically, the planetary gear mechanism comprises: the sun gear 40 mounted on the motor spindle 7 of the drive motor 5; the planetary gears 41 meshing with the sun gear 40; the internal gear 42 meshing with the planetary gears 41 and having the output gear 16 formed therein; the planetary gear support 43 for supporting the planetary gears 41; the one-way clutch 44 for regulating the rotation of the planetary gear support 43 in the predetermined direction; and the one-way clutches 45 for regulating the rotations of the planetary gears 41 in the predetermined direction. In the planetary gear mechanism, the rotational speed of the output gear 16 is switched by regulating the rotation of the planetary gear support 43 and the planetary gears 41 with the one-way clutches 44 and 45.

In case the speed change mechanism 11 is thus constructed of the planetary gear mechanism for regulating the rotations by using the one-way clutches 44 and 45, the speed of the rotational driving force of the drive motor 5 can be changed with a space equivalent to that of the ordinary planetary gear mechanism so that the space necessary especially in the axial direction of the motor spindle 7 can be reduced. Moreover, the rotational driving force of the drive motor 5 can be transmitted via the power transmission route of the sun gear 40, the planetary gears 41 and the internal gear 42, which are used in the ordinary planetary gear mechanism, so that the silence and durability can be retained at the same level as that of the ordinary planetary gear mechanism.

In the electric fishing reel 1 of this embodiment, the drive motor 5, the speed change mechanism 11 and the power transmission mechanism 12 are arranged in the spool 4. In this case, the space for housing the drive motor 5, the speed change mechanism 11 and the power transmission mechanism 12 can be suppressed to a small one according to the size reduction of the speed change mechanism 11. Therefore, even in the case of the construction in which the drive motor 5 and so on are arranged in the spool 4, the entire size reduction of the electric fishing reel 1 can be realized. Especially in case the speed change mechanism 11 is arranged in the space 4, the meshing noises (chatter) of the gears on the power transmission route can be more reduced to provide the electric fishing reel 1 more excellent in silence.

In the electric fishing reel 1 of this embodiment, the power transmission mechanism 12 includes the planetary gear mechanism, and the output gear 16 of the speed change mechanism 11 is made to function as the first sun gear of the planetary gear mechanism. In this case, the output gear 16 of the speed change mechanism 11 acts as a portion of the power transmission mechanism 12 so that the number of parts of the power transmission mechanism 12 can be reduced to make smaller the space necessary for the speed change mechanism 11 and the power transmission mechanism 12. Moreover, the number of parts can be reduced to reduce the cost necessary for manufacturing those mechanisms.

Figure 5:
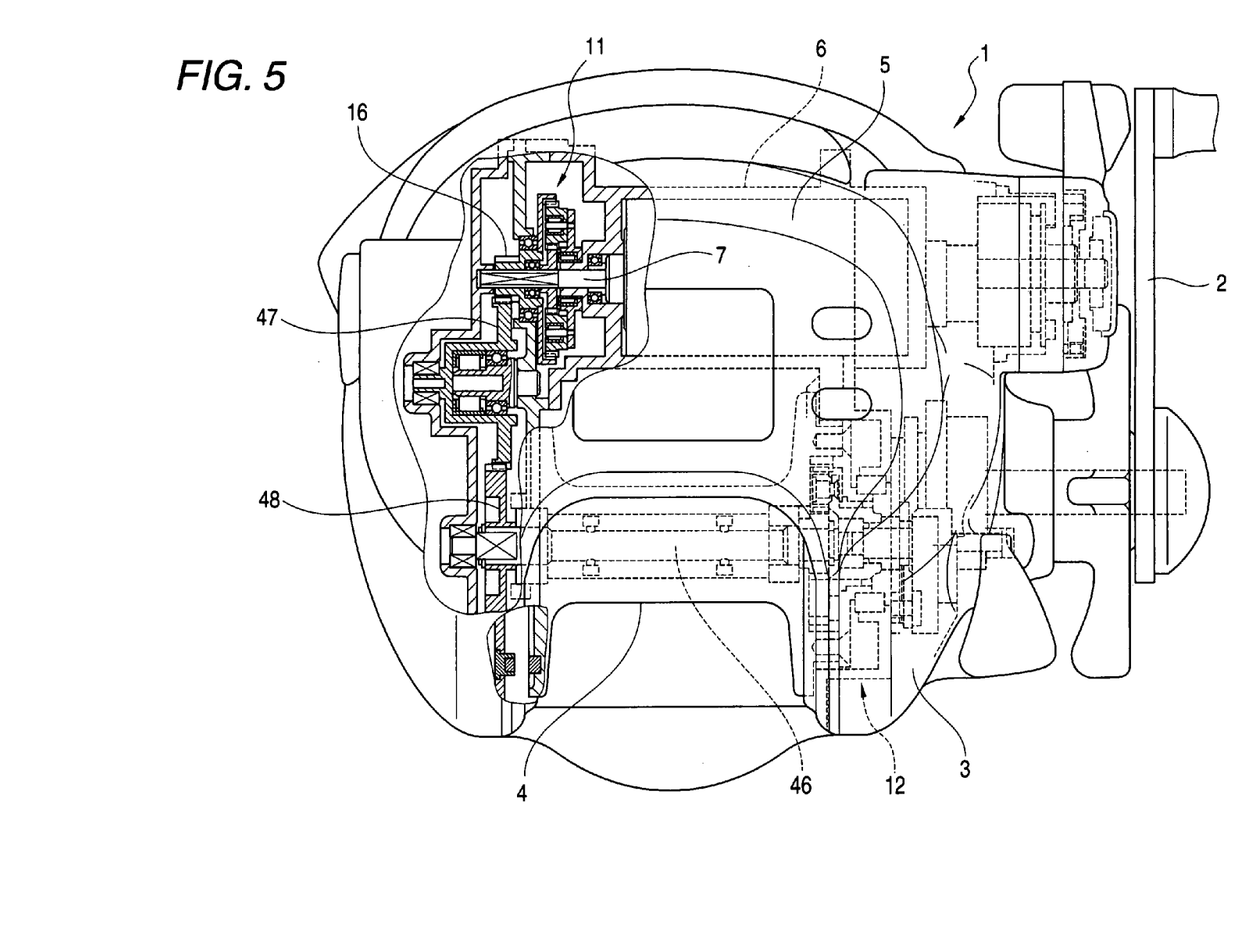
FIG. 5 is a diagram showing a second embodiment of the electric fishing reel according to the present invention, and is a partially sectional view showing a portion, in which the speed change mechanism is arranged.

Here, the invention can be applied not only to the electric reel thus constructed but also to the electric reel of the type, in which the drive motor 5 is arranged in the reel body 3 in front of the spool 4, as shown in FIG. 5.

Second Embodiment

Figure 6:
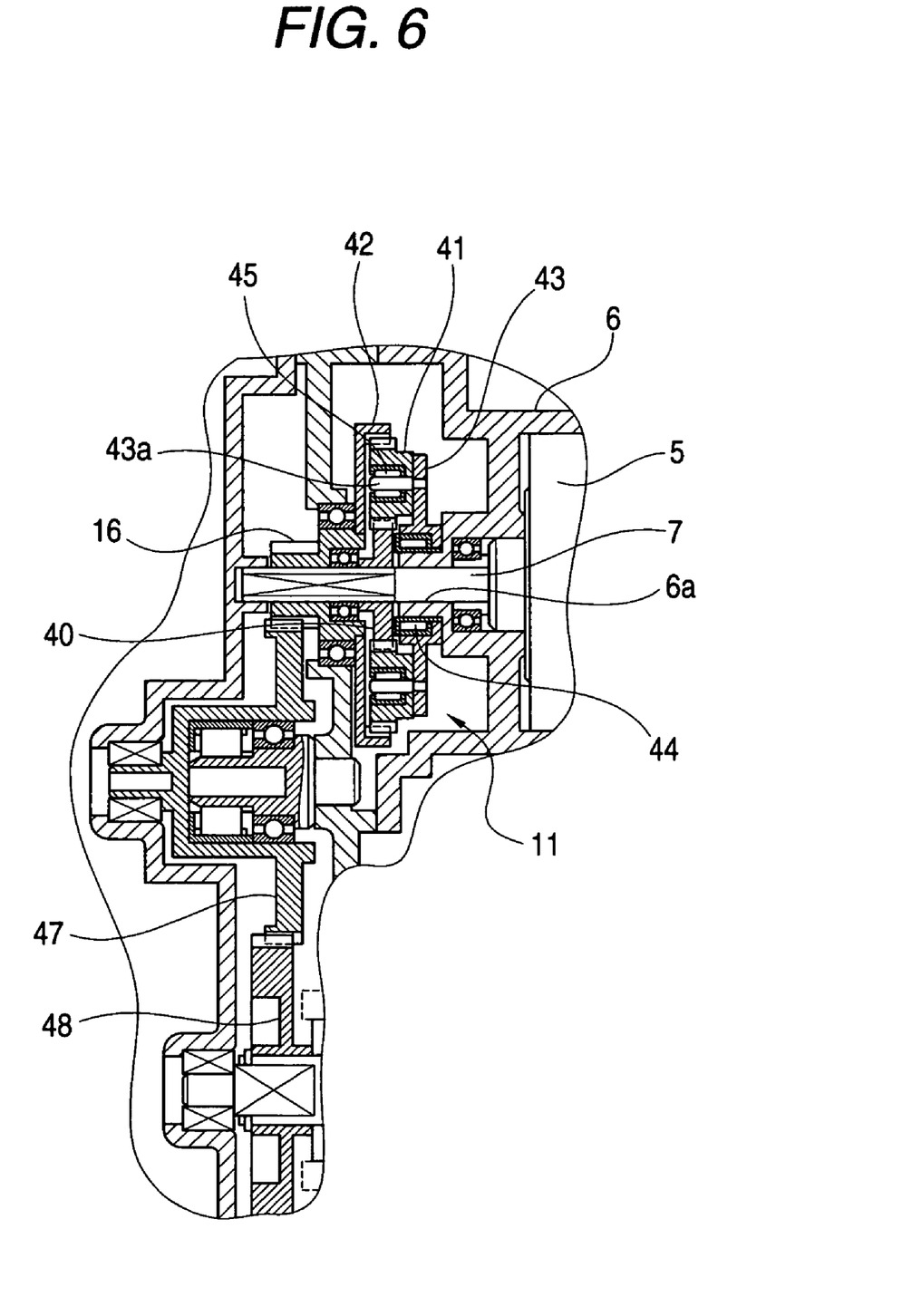
FIG. 6 is a diagram showing a construction of the speed change mechanism.
Figure 7:
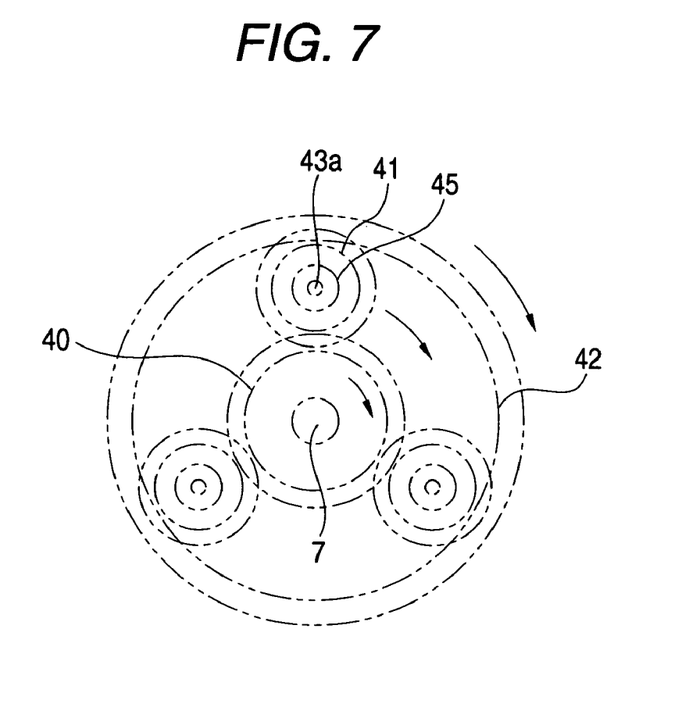
FIG. 7 is a schematic diagram for explaining a power transmission route in the high-speed mode.
Figure 8:
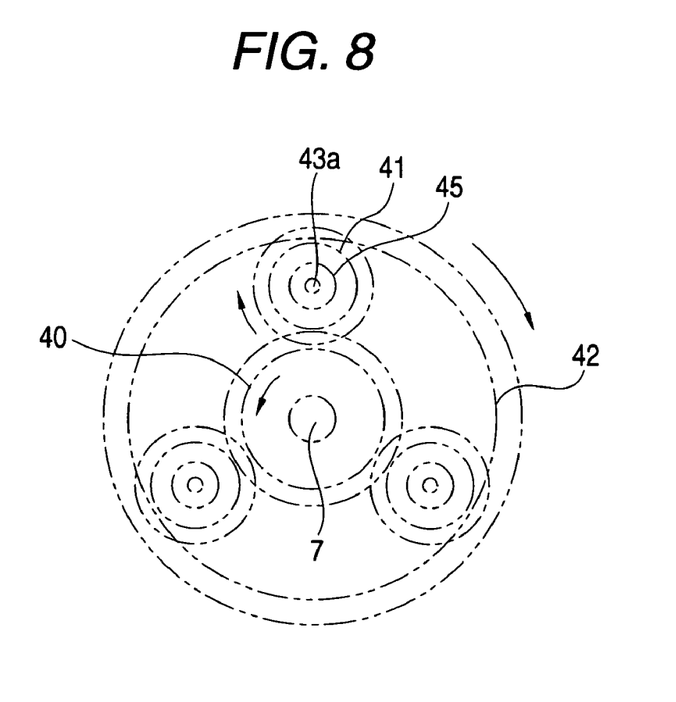
FIG. 8 is a schematic diagram for explaining a power transmission route in the low-speed mode.

A second embodiment of the invention will be described with reference to FIG. 5 to FIG. 8. FIG. 5 is a partially sectional view showing a portion in which the speed change mechanism is arranged; FIG. 6 is a diagram showing a construction of the speed change mechanism; FIG. 7 is a schematic diagram for explaining a power transmission route in a high-speed mode; and FIG. 8 is a schematic diagram for explaining a power transmission route in a low-speed mode. In the embodiment to be described in the following, the components similar to those of the aforementioned first embodiment are designated by the common reference numerals, and their detailed description is omitted. Here, the "forward rotation" means a clockwise rotation, as viewed in FIG. 5 from the right side side, and the "backward rotation" means a counter-clockwise rotation, as viewed in the same direction as above.

In the second embodiment, a spool shaft 46 is rotatably supported through a bearing between the left side and right side frames constructing the reel body 3, and the spool 5 is arranged to enclose that spool shaft 46. In front of the spool 4, there is arranged the cylindrical motor case 6, which is fixed relative to the reel body 3, and in which the drive motor 5 is housed. Here in the second embodiment, different from the first embodiment, the motor spindle 7 is protruded to the left side frame side of the reel body 3.

In the same manner as the first embodiment, the leading end side of the motor casing 6 is extended at its portion, in which the motor spindle 7 is arranged, in the axial direction (i.e., in the direction toward the left side frame of the reel body 3) and is protruded at its central portion toward the axis. On the protruded portion of the motor casing 6 and on the motor spindle 7 extended from that portion, there is mounted the speed change mechanism 11 for switching the high-speed mode and the low-speed mode in accordance with the rotational direction of the motor spindle 7.

On the left side frame side of the reel body 3, moreover, there are rotatably supported gears 47 and 48, which sequentially mesh with the output gear 16 of the speed change mechanism 11. The aforementioned spool shaft 46 is mounted on the gear 48. On the right side frame side of that spool shaft 46, there is arranged the power transmission mechanism 12, which functions as the reduction gear mechanism. The planetary gears belonging to the power transmission mechanism 12 are constructed to mesh with the internal teeth formed in the end face of the spool 4. The driving force of the drive motor 5 is transmitted to the spool 4 through the speed change mechanism 11, the gears 47 and 48, the spool shaft 46 and the power transmission mechanism 12.

Here, the speed change mechanism 11 in the second embodiment takes the same construction as that of the speed change mechanism 11 of the first embodiment, excepting the following points. The second embodiment is different from the speed change mechanism 11 of the first embodiment in that the drive motor 5 is arranged in the reel body 3 in front of the spool 4 so that the rotational driving force of the drive motor 5, the speed of which is changed by the speed change mechanism 11, is transmitted not to the power transmission mechanism 12 on the motor spindle 7 but through the gears 47 and 48 arranged on the different shafts and through the spool shaft 46.

Moreover, the speed change mechanism 11 in the second embodiment is different from the speed change mechanism 11 of the first embodiment in that the direction to regulate the rotational driving forces of the one-way clutches 44 and 45 is reversed from that of the first embodiment. In the speed change mechanism 11 in the second embodiment, more specifically, the one-way clutch 44, as arranged between the planetary gear support 43 and the protruding portion 6a of the motor casing 6, is constructed to regulate the rotational driving force in the backward direction, as shown in FIG. 7 and FIG. 8, but to permit the rotational driving force in the forward direction. On the other hand, the one-way clutches 45, as arranged between the planetary gears 41 and the support pins 43a of the planetary gear support 43 are also constructed to regulate the rotational driving force in the reverse direction, as shown in FIG. 7 and FIG. 8, but to permit the rotational driving force in the forward direction.

In this speed change mechanism 11, as the motor spindle 7 is driven forward, the sun gear 40 also responsively rotates forward, as shown in FIG. 7. In accordance with the forward rotation of the sun gear 40, a backward force then acts on the planetary gears 41, but the backward rotations of the planetary gears 41 are regulated by the actions of the one-way clutches 45. Therefore, the planetary gears 41 do not rotate backward but stand still so that the planetary gear support 43 rotates (or revolves) in the same forward direction as that of the sun gear 40. Here, the one-way clutch 44 permits the forward drive of the planetary gear support 43 so that the forward rotation of the planetary gear support 43 in the same direction as that of the sun gear 40 is not regulated. In accordance with the forward rotation of the planetary gear support 43, moreover, the internal gear 42 rotates forward integrally meshing with the planetary gears 41. Thus, the rotational driving force of the motor spindle 7 in the forward direction is neither subjected to the rotating actions of the planetary gears 41 nor decelerated but is transmitted to the internal gear 42 (in the high-speed mode).

As the internal gear 42 rotates forward, the output gear 16 integrated with the internal gear 42 also rotates forward, and the rotational driving force by the motor spindle 7 is transmitted through the gears 47 and 48 to the spool shaft 46 so that the spool shaft 46 is driven forward. Then, the power transmission mechanism 12 transmits the rotational driving force transmitted from the spool shaft 46, in the decelerated state to the spool 46. As a result, when the motor spindle 7 is driven forward, the spool 4 is rotationally driven in the high-speed mode.

In this speed change mechanism 11, on the other hand, as the motor spindle 7 is driven backward, the sun gear 40 is also responsively rotated backward, as shown in FIG. 8.

When the sun gear 40 rotates backward, the planetary gears 41 rotate forward. At this time, as the planetary gears 41 rotate forward on their axes, the force in the same backward direction as that of the sun gear 40 acts on the planetary gear support 43, but the backward rotation of the planetary gear support 43 is regulated by the action of the one-way clutch 44. As a result, the planetary gears 41 do not move (or revolve) together with the planetary gear support 43 but rotate (on their axes). Here, the one-way clutches 45 permit the forward drives of the planetary gears 41 but do not regulate the forward rotations of the planetary gears 41. In accordance with these forward rotations of the planetary gears 41, moreover, the internal gear 42 is rotated in the same direction in the decelerated state. Thus, the rotational driving force of the motor spindle 7 in the backward direction is transmitted through the planetary gears 41 to the internal gear 42 and is decelerated (in the low-speed mode).

When the internal gear 42 rotates forward, the output gear 16 integrated with the internal gear 42 also rotates forward as in the aforementioned high-speed mode so that the rotational driving force by the motor spindle 7 is transmitted through the gears 47 and 48 to the spool shaft 46 so that the spool shaft 46 is driven forward. Then, the power transmission mechanism 12 transmits the rotational driving force transmitted from the spool shaft 46, in the decelerated state to the spool 4. Therefore, when the motor spindle 7 is driven backward, the spool 4 is rotationally driven in the low-speed mode.

According to the electric fishing reel 1 of the second embodiment, as has been described hereinbefore, even in the electric reel of the type, in which the drive motor 5 is arranged in front of the spool 4, the speed change mechanism 11 having the output gear 16 capable of switching the rotational speed is rotatably mounted on the motor spindle 7 of the drive motor 5 so that the rotational speed of the output gear 16 can be switched by regulating the transmission of the rotations of the motor spindle 7 to the output gear 16. It is possible to acquire advantages like those of the aforementioned first embodiment.

The embodiments of the electric fishing reel according to the invention have been described hereinbefore. However, the invention should not be limited to the foregoing embodiments but can be modified in various manners. The sizes and shapes, as shown in the accompanying drawings, of those embodiments should not be limited thereto but could be suitably modified within the scope for exhibiting the effects of the invention. In addition, the invention can be suitably exemplified without departing from the range of its object.

The foregoing constructions have been described on the case, in which the output gear 16 fixed on the internal gear 42 is made to function as the output portion of the speed change mechanism 11. However, the construction of the planetary gear mechanism making the speed change mechanism 11 should not be limited thereto but can be suitably modified. For example, the speed change mechanism 11 may adopt any construction, if it is constructed of the planetary gear mechanism, the rotation regulation of which is made by using the one-way clutches. Especially, the output portion may take any construction if it can transmit the rotation of the internal gear 42. Moreover, the spacing between the speed change mechanism 11 and the power transmission mechanism 12 can be arbitrarily changed.

What is claimed is:

1. An electric fishing reel comprising:
   a reel body;
   a spool rotatably supported by the reel body;
   a drive motor which drives the spool, the drive motor having a spindle;
   a speed change mechanism that is rotatably mounted to the spindle, the speed change mechanism including an output portion that rotates at a rotational speed that is switched into a high speed or a low speed in accordance with a rotational direction of the spindle; and
   a power transmission mechanism that transmits the rotation of the output portion to the spool,
   wherein the speed change mechanism switch the rotation speed by regulating transmission of the rotation of the spindle to the output portion.

2. The electric fishing reel according to claim 1, wherein the speed change mechanism includes a planetary gear mechanism using a one-way clutch for regulating the rotations.

3. The electric fishing reel according to claim 2, wherein the speed change mechanism includes:
   a sun gear mounted on the spindle;
   planetary gears meshing with the sun gear;
   an internal gear meshing with the planetary gears and having the output portion formed therein;
   a planetary gear support for supporting the planetary gears;
   a first one-way clutch for regulating rotation of the planetary gear support in a predetermined direction; and
   second one-way clutches for regulating rotations of the planetary gears in a predetermined direction, respectively,
   wherein the rotational speed of the output portion is switched by selectively regulating the rotations of the planetary gear support and the planetary gears with the first and second one-way clutches.

4. The electric fishing reel according to claim 1, wherein the drive motor, the speed change mechanism and the power transmission mechanism are arranged in the spool.

5. The electric fishing reel according to claim 4, wherein the power transmission mechanism includes a planetary gear mechanism so that the output portion of the speed change mechanism is made to function as a sun gear of the planetary gear mechanism of the power transmission mechanism.

* * * * *